(12) United States Patent
Hernacki et al.

(10) Patent No.: US 8,949,325 B1
(45) Date of Patent: Feb. 3, 2015

(54) DYNAMIC DISCOVERY AND UTILIZATION OF CURRENT CONTEXT INFORMATION

(75) Inventors: Brian Hernacki, Mountain View, CA (US); William E. Sobel, Jamul, CA (US); Luigi Mercone, South Plainfield, NJ (US)

(73) Assignee: Symantec Corporation, Mountain View, CA (US)

( * ) Notice: Subject to any disclaimer, the term of this patent is extended or adjusted under 35 U.S.C. 154(b) by 1975 days.

(21) Appl. No.: 11/771,959

(22) Filed: Jun. 29, 2007

(51) Int. Cl.
 *G06F 15/16* (2006.01)
 *G06F 7/04* (2006.01)

(52) U.S. Cl.
 USPC .............................................. 709/204; 726/5

(58) Field of Classification Search
 USPC ........ 707/104.1, 3; 709/226, 205, 218; 726/9; 701/211
 See application file for complete search history.

(56) References Cited

U.S. PATENT DOCUMENTS

| | | | | |
|---|---|---|---|---|
| 4,907,268 | A * | 3/1990 | Bosen et al. | 713/193 |
| 6,684,176 | B2 * | 1/2004 | Willins et al. | 702/150 |
| 7,107,269 | B2 * | 9/2006 | Arlein et al. | 705/26.5 |
| 7,194,512 | B1 * | 3/2007 | Creemer et al. | 709/205 |
| 7,392,259 | B2 * | 6/2008 | Lee et al. | 715/234 |
| 7,428,750 | B1 * | 9/2008 | Dunn et al. | 726/8 |
| 7,506,369 | B2 * | 3/2009 | Buch et al. | 726/12 |
| 7,523,200 | B2 * | 4/2009 | Gross et al. | 709/225 |
| 7,549,125 | B2 * | 6/2009 | Dunn et al. | 715/739 |
| 7,681,203 | B2 * | 3/2010 | Mandato et al. | 719/316 |
| 7,685,237 | B1 * | 3/2010 | Weaver et al. | 709/205 |
| 2003/0163603 | A1 * | 8/2003 | Fry et al. | 709/328 |
| 2004/0249915 | A1 * | 12/2004 | Russell | 709/223 |
| 2005/0091272 | A1 * | 4/2005 | Smith et al. | 707/104.1 |
| 2005/0097455 | A1 * | 5/2005 | Zhou et al. | 715/513 |
| 2005/0289153 | A1 * | 12/2005 | Pabla et al. | 707/100 |
| 2005/0289180 | A1 * | 12/2005 | Pabla et al. | 707/104.1 |
| 2005/0289470 | A1 * | 12/2005 | Pabla et al. | 715/751 |
| 2006/0161680 | A1 * | 7/2006 | Balsevich | 709/245 |
| 2006/0165040 | A1 * | 7/2006 | Rathod et al. | 370/335 |
| 2006/0242306 | A1 * | 10/2006 | Boro et al. | 709/227 |
| 2006/0253894 | A1 * | 11/2006 | Bookman et al. | 726/2 |
| 2006/0256748 | A1 * | 11/2006 | Jung et al. | 370/328 |
| 2006/0265509 | A1 * | 11/2006 | Pandit | 709/230 |
| 2006/0294465 | A1 * | 12/2006 | Ronen et al. | 715/706 |
| 2007/0027815 | A1 * | 2/2007 | Sobel et al. | 705/59 |
| 2007/0043811 | A1 * | 2/2007 | Kim et al. | 709/203 |
| 2007/0192493 | A1 * | 8/2007 | Manolache et al. | 709/226 |
| 2007/0282526 | A1 * | 12/2007 | Smith | 701/211 |
| 2008/0086261 | A1 * | 4/2008 | Robinson et al. | 701/200 |
| 2008/0133580 | A1 * | 6/2008 | Wanless et al. | 707/102 |
| 2008/0183678 | A1 * | 7/2008 | Weston et al. | 707/3 |
| 2008/0244721 | A1 * | 10/2008 | Barrus et al. | 726/9 |
| 2008/0244722 | A1 * | 10/2008 | Satish et al. | 726/9 |
| 2008/0256594 | A1 * | 10/2008 | Satish et al. | 726/1 |
| 2008/0263626 | A1 * | 10/2008 | Bainter et al. | 726/1 |
| 2008/0268868 | A1 * | 10/2008 | Maitland | 455/456.1 |
| 2008/0281854 | A1 * | 11/2008 | Abhyanker | 707/102 |
| 2008/0294747 | A1 * | 11/2008 | Abhyanker | 709/218 |
| 2009/0006975 | A1 * | 1/2009 | Salim et al. | 715/738 |
| 2009/0024584 | A1 * | 1/2009 | Dharap et al. | 707/3 |
| 2009/0117884 | A1 * | 5/2009 | Mosker | 455/414.3 |

* cited by examiner

*Primary Examiner* — Brian P Whipple
*Assistant Examiner* — Michael A Chambers
(74) *Attorney, Agent, or Firm* — Brill Law Office; Jeffrey Brill

(57) ABSTRACT

A digital identity device automatically discovers a current environmental context in order to dynamically generate a digital persona that is appropriate and specific to that context. The digital identity device can also output physical tokens that are appropriate or specific to the identity context.

20 Claims, 2 Drawing Sheets

DYNAMIC DISCOVERY AND UTILIZATION OF CURRENT CONTEXT INFORMATION

TECHNICAL FIELD

This invention pertains generally to digital identity systems, and more specifically to enabling digital identity devices to dynamically discover and utilize current context specific information.

BACKGROUND ART

Digital identity systems allow computer users to establish a base set of credentials, and to build multiple "personas" on top of the base credentials. For example, user's base credentials might include information such as name and default email address. Separate "work" and "home" personas could build upon and customize the base data, by adding information such as work and home phone numbers, non-default (e.g., private or specialized) email addresses, etc.

If a user whishes to exchange identity information in a given context, the user is currently required to pick and/or edit the persona to use manually. For example, a user could decide to use a previously configured work persona to provide contact information to a colleague while attending a work-related event. While this is sufficient in very general cases, it is neither flexible nor ideal.

For example, suppose a user is attending a large industry conference, and has a local, conference-specific hotel room number, telephone extension and temporary email address. The user may wish to provide this event-specific data as contact information to others at the conference. As such, neither the user's work nor home persona would be appropriate in this context. Instead, the user would have to manually configure a new persona with the conference-specific information. While a user might manually construct a small number of personas, construction of event-specific or other fine grained personas would require excessive effort on the part of the user.

Furthermore, even given a large number of existing personas, the transaction context alone might not provide sufficient information to aid the user in the selection of the correct persona to use. Environment context information is often required as well. For example, the phone number a user might distribute in a work related context could differ at an internal meeting (e.g., the local extension) versus an external meeting (e.g., the full number including the area code).

Therefore, it would be desirable to be able to automatically discover a current environmental context, and leverage this information to at least partially automate construction of digital personas for identity exchanges.

Additionally, while there exist rich technologies to exchange identity information in the digital world, the physical world is more limited. Currently a user wishing to exchange identity information physically is limited to either using pre-printed business cards or manually constructing one (i.e., by writing on paper). The use of pre-printed business cards limits flexibility. Whatever information is on the card must be used in all situations, and cannot be tailored to fit the current context (e.g., event, location, language). The latter method, while more flexible, requires significantly more effort, and is often limited by the capability of the user (i.e., does the user know Japanese?). Nonetheless, identity information exchange is often necessary in the physical world (for example, due to lack of digital communication devices, rules governing device use, etc.).

Neither of the two existing methods allow any coupling to a digital identity system. Thus, a user who has a rich set of digital identity information has no way to easily generate physical tokens based on this digital data. Therefore, it would also be desirable to allow real-time generation of physical tokens based on contextual and environmental digital identity data.

SUMMARY

Current environmental context is automatically discovered and used in transactions such as digital information exchange and the real-time printing of dynamic business cards. A digital identify device connects to a local network and performs a query for local context information. The digital identify device uses the local context information to create a context specific digital persona. The context specific user information in this digital persona can be used for both electronic and print-based transactions.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
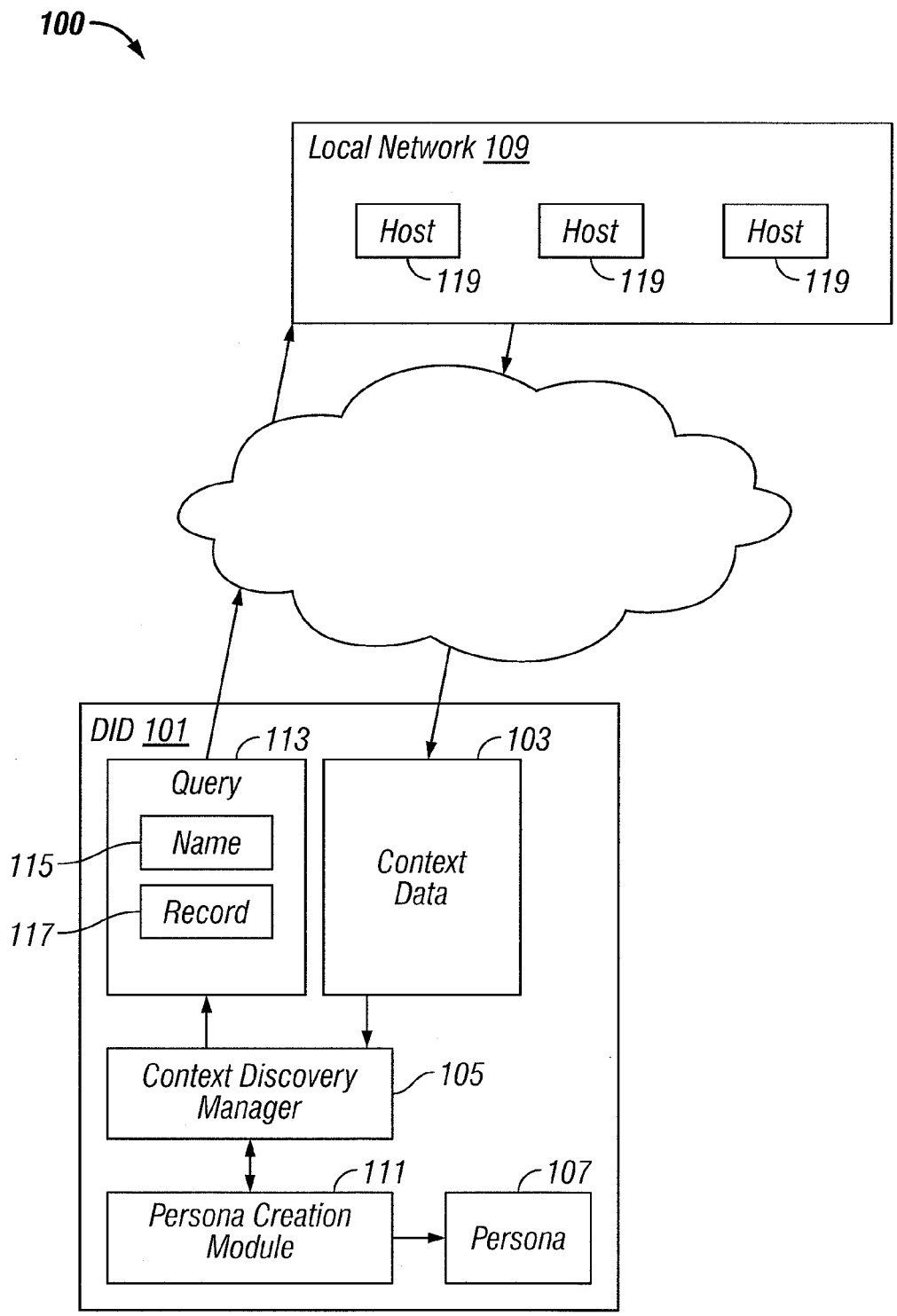
FIG. 1 is a block diagram illustrating a system for dynamically discovering context information, according to some embodiments of the present invention.

FIG. 1 illustrates a system 100 in which a digital identity device 101 dynamically discovers context information 103, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a context discovery manager 105 running on a digital identity device 101 can automatically discover information 103 concerning its environmental context. As used herein, a digital identity device (DID) 101 comprises any portable computing device capable of generating digital identity credentials 107 and outputting them (electronically and/or physically) in some manner. This includes but is not limited to a laptop computer, a personal digital assistant, a cell phone or other telephonic device or a handheld printer.

As illustrated, a DID 101 accesses a local network 109, using any protocol (either wired or wireless). For the sake of example, this specification describes communication between a DID 101 and the local network 109 using Internet Protocol (IP). It is to be understood that in other embodiments, other communication protocols (e.g., WiFi, BT, GPRS) are used as desired.

At given times, the context discovery manager 105 attempts to discover local context information 103. For example, the context discovery manager 105 can make such an attempt upon DID 101 power-up, upon DID 101 access and/or usage, responsive to user input and/or periodically as desired. In one embodiment of the present invention, the context discovery manager 105 attempts to discover local context information 103 by performing a domain name service (DNS) query 113 on a known, local, reserved name 115. For example, it could perform a DNS query 113 on the reserved name "LOCALCONTEXT." (note the terminating dot). More specifically, the context discovery manager 105 can perform a DNS query 113 for a text (TXT) record 117 for the reserved name 115 (e.g., "LOCALCONTEXT.") As is known by those of ordinary skill in the relevant art, TXT records 117 associated with domain names 115 are the record types used by functions such as domainkeys for utilizing extended information concerning a domain (as opposed to defining a new record type). The implementation mechanics of utilizing. DNS queries 113 and TXT records 117 within the context of the present invention will be readily apparent to those of ordinary skill in the revenant art in light of the present specification.

In order to support these DNS queries 113, system administrators in charge of various localized network environments (e.g., event administrators at conferences, system administrators at hotels, etc.) can configure and provide context information 103 mapped to the reserved keyword, such that a DNS query 113 for a TXT record 117 would return the relevant context data 103 in an expected, parsable format. For example, a query 113 executed on Feb. 4, 2007 on the 2007 RSA Conference local network 109 could return:
LOCALCONTEXT. IN TXT name=RSA2007: date=02042007"type=conf"

In this example, the local context is named "RSA2007," the date is specified as "02042007" and the environment type is specified as "conf". Of course, both this format and this context data 103 serve as examples only. More, less and/or different context information 103 can be provided. The environmental data 103 can be provided in any parsable format expected by the context discovery manager 105, according to various embodiments of the present invention. The data 103 is returned in some known schema, but this can be open ended (as with existing identity attribute schemas).

If the query 113 does not return any context data 103 (i.e., if the query 113 on the reserved name 115 is unresolved, either because it is not set in the local context or because a communication or other technical failure occurs), the DID 101 can operate with default (or user set) values, without any context guidance. However, if resolved, the response to the DNS query 113 contains information 103 describing the local context (e.g., name, date, etc.) as described above. In some embodiments, if the query 113 is unresolved, the context discovery manager 105 gleans at least some context information 103 itself. For example, the context discovery manager 105 can examine identifying information (e.g., an IP address) concerning at least one computing device associated with the local network 109 (e.g., a local network host 119). The context discovery manager 105 can also use a global positioning system or the like (not illustrated) to obtain data concerning its current location. This type of context discovery manager 105 self-gleaned data can be used by itself, or combined with user set or default values (or alternatively can be used to supplement context data 103 obtained from a resolved query 113).

DNS is utilized to obtain local context information 103 in some embodiments of the present invention because of its current widespread acceptance and its ease of deployment. In other embodiments, other schemes are utilized to implement similar functionalities. For example, in one embodiment, a local query 113 is performed via a dedicated protocol. Other embodiments use other lookup systems as desired.

Once the context discovery manager 105 has obtained local context information 103, a persona creation module 111 can create a persona 107 specific to the current environment. In some embodiments, the persona creation module 111 waits to do so until a user attempts a subsequent DID 101 based transaction. In other embodiments, the persona creation module 111 creates the new persona 107 upon receipt of the relevant contextual data 103, or according to some other trigger as desired.

Figure 2:
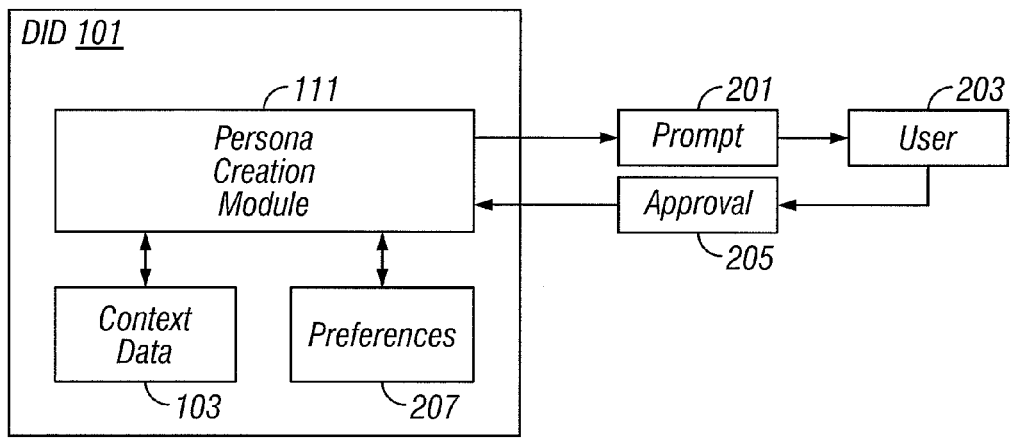
FIG. 2 is a block diagram illustrating a user's participation in the creation of digital personas, according to some embodiments of the present invention.

As illustrated in FIG. 2, before creation of a persona 107, the persona creation module 111 typically prompts 201 the user 203 as to whether he or she wants a context specific persona 107 based on the new context data 103. Only responsive to approval 205 from the user 203 is the persona 107 created. Creation of the persona 107 can be directed both by user 203 and/or default preferences 207 (e.g., always create context specific email addresses). The creation of the persona 107 can also be directed by the contents of the context specific data 103 itself (e.g., if the data 103 includes an email domain, always create context specific email addresses using that). In other words, the provided context specific information 103 can be treated as a 'hint' to the persona creation module 111. In any case, the persona creation module 111 can use the newly created persona 107 for the current transaction. The persona creation module 111 stores created personas 107 associated with given contexts. Successive transactions within a given context can be performed using the appropriate created persona 107.

Typically, as a security measure, the persona creation module 111 displays locally provided content to the user 203, and only utilizes provided content to create a persona 107 after user approval 205. The user 203 can also typically edit provided content. In some embodiments, user approval 205 is not required for all or certain types of provided content. The end user 203 can configure the DID 101 to accept contexts automatically, to deny all suggested contexts or to prompt 201 the user 203 to accept or deny unknown contexts. These contexts can be cached locally much like an operating system can cache known wireless networks. Thus, their individual defaults can be modified even when not in proximity to the context source.

In order to prevent a security breach in which an attacker attempts to convince a DID 101 to automatically provide it information 103 for a previously cached context, context entries can also be signed and contain a public key (not illustrated). In such embodiments, later retransmissions (after the user 203 has initially approved) would need to be signed with the same public key. This would prevent fake context entries, as they would not be able to sign with the matching key.

Figure 3:
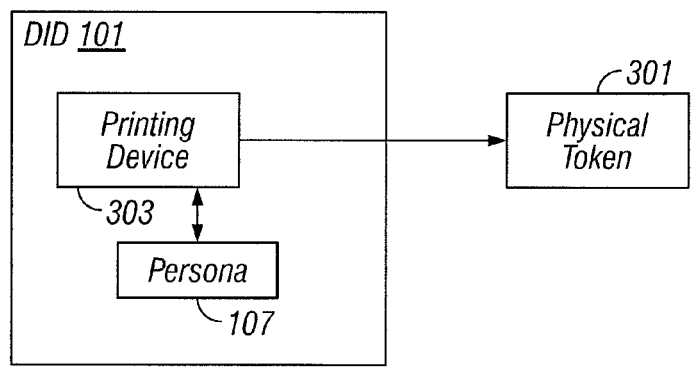
FIG. 3 is a block diagram illustrating using context information to output physical tokens, according to some embodiments of the present invention.

Turning to FIG. 3, creation of physical tokens 301 utilizing a current digital persona 107 is illustrated, according to some embodiments of the present invention. In these embodiments, the DID 101 includes some type of low power, small form factor physical output device 303, such as those manufactured by Zink®. Such small form factor output devices 303 allow portable computing devices such as mobile phones to include physical printing devices 303.

As illustrated in FIG. 3, the portable printing device 303 is coupled to the DID 101, e.g., in an offline mode or via a wireless connection. This combination allows an end user to print a physical identity token 301, such as a dynamically configured business card 301. By using data from a current digital persona 107, these physical tokens 301 can be context sensitive, and printed on demand as needed. A printed card 301 can contain dynamic, context appropriate information 103 such as a disposable email address or temporary phone number if given out at a conference. Physical tokens 301 can be printed in an appropriate local language for the receiver (e.g., where the user is traveling). The card 301 can also include notes and the like concerning the interaction that causes the card 301 to be generated. These physical tokens 301 can contain human readable and/or machine readable information (e.g., a barcode for later scanning).

This printing device allows business cards 301 to be printed on demand. The output selected for the business card 301 is tied to a chosen identity 107 at the time of output. This allows the user to determine which identify protection options (disposable email, disposable phone numbers, work or personal identity, etc.) which are utilized.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for dynamically discovering and utilizing current context information by a digital identity device with a user, the method comprising the steps of:
    connecting, by the digital identity device, to a local network;
    requesting, by the digital identity device, context information concerning a current local environment of the digital identity device;
    receiving, by the digital identity device, context information concerning the current local environment of the digital identity device, responsive to the request; and
    creating, by the digital identity device, a digital persona of the user of the digital identity device based on the received context information concerning the current local environment of the digital identity device, wherein the created digital persona comprises real world information concerning the user of the digital identity device, comprising at least context specific contact information for use in a context specific transaction.

2. The method of claim 1 wherein requesting, by a digital identity device, context information concerning the current local environment further comprises performing at least one step from a group of steps consisting of:
    performing, by the digital identity device, a domain name service query on a local, reserved name;
    performing, by the digital identity device, a domain name service query for a text record for a local, reserved name;
    performing, by the digital identity device, a local query via a dedicated protocol;
    examining, by the digital identity device, identifying information concerning at least one computing device associated with the local network; and
    gleaning, by the digital identity device, current physical location information from a positioning system.

3. The method of claim 1 wherein creating, by the digital identity device, a digital persona of the user of the digital identity device based on the received context information further comprises:
    prompting, by the digital identity device, the user of the user of the digital identity device as to whether the user would like a digital persona based on the context information; and
    creating, by the digital identity device, the digital persona of the user of the digital identity device responsive to receiving an affirmative indication from the user.

4. The method of claim 3 wherein prompting, by the digital identity device, the user of the digital identity device further comprises:
    displaying, by the digital identity device, at least some of the received context information to the user of the digital identity device.

5. The method of claim 1 wherein creating, by the digital identity device, a digital persona of the user of the digital identity device based on the received context information further comprises performing at least one step from a group of steps consisting of:
    receiving, by the digital identity device, at least one edit from the user of the digital identity device to the digital persona; and
    using, by the digital identity device, at least some default information in the creation of the digital persona of the user of the digital identity device.

6. The method of claim 1 further comprising:
creating, by the digital identity device, a plurality of digital personas of the user of the digital identity device, each digital persona being based on received context information concerning a separate environment; and
storing, by the digital identity device, the plurality of digital personas of the user of the digital identity device.

7. The method of claim 1 further comprising:
executing, by the digital identity device, a transaction in a given context using a digital persona of the user of the digital identity device associated with that context.

8. The method of claim 7 wherein the transaction further comprises one from a group of transactions consisting of:
providing, by the digital identity device, digital information concerning the user of the digital identity device to another party electronically;
exchanging, by the digital identity device, digital information concerning the user of the digital identity device with another party electronically; and
outputting, by the digital identity device, a physical token containing persona information concerning the user of the digital identity device in printed form.

9. The method of claim 8 wherein outputting, by the digital identity device, a physical token containing persona information concerning the user of the digital identity device in printed form further comprises performing at least one step from a group of steps consisting of:
outputting, by the digital identity device, a physical token containing human readable information concerning the user of the digital identity device; and
outputting, by the digital identity device, a physical token containing machine readable information concerning the user of the digital identity device.

10. The method of claim 1 further comprising:
signing, by the digital identity device, at least one digital persona of the user of the digital identity device;
storing, by the digital identity device, the at least one signed digital persona of the user of the digital identity device; and
only accepting, by the digital identity device, context information concerning the at least one signed digital persona of the user of the digital identity device that is signed with an associated public key.

11. At least one non-transitory computer readable storage medium containing a computer program product for dynamically discovering and utilizing current context information by a digital identity device with a user, the computer program product comprising:
program code for connecting to a local network;
program code for requesting context information concerning a current local environment of the digital identity device;
program code for receiving context information concerning the current local environment of the digital identity device, responsive to the request; and
program code for creating a digital persona of the user of the digital identity device based on the received context information concerning the current local environment of the digital identity device, wherein the created digital persona comprises real world information concerning the user of the digital identity device, comprising at least context specific contact information for use in a context specific transaction.

12. The computer program product of claim 11 wherein the program code for requesting context information concerning the current local environment of the digital identity device further comprises program code for performing at least one step from a group of steps consisting of:
performing a domain name service query on a local, reserved name;
performing a domain name service query for a text record for a local, reserved name;
performing a local query via a dedicated protocol;
examining identifying information concerning at least one computing device associated with the local network; and
gleaning current physical location information from a positioning system.

13. The computer program product of claim 11 wherein the program code for creating a digital persona of the user of the digital identity device based on the received context information further comprises:
program code for prompting the user of the digital identity device as to whether the user would like a digital persona based on the context information; and
program code for creating the digital persona of the user of the digital identity device responsive to receiving an affirmative indication from the user.

14. The computer program product of claim 13 wherein the program code for prompting the user of the digital identity device further comprises:
program code for displaying at least some of the received context information to the user of the digital identity device.

15. The computer program product of claim 11 wherein the program code for creating a digital persona of the user of the digital identity device based on the received context information further comprises program code for performing at least one step from a group of steps consisting of:
receiving at least one edit from the user of the digital identity device to the digital persona; and
using at least some default information in the creation of the digital persona of the user of the digital identity device.

16. The computer program product of claim 11 further comprising:
program code for creating a plurality of digital personas of the user of the digital identity device, each digital persona being based on received context information concerning a separate environment; and
program code for storing the plurality of digital personas of the user of the digital identity device.

17. The computer program product of claim 11 further comprising program code for performing at least one step from a group of steps consisting of:
executing a transaction in a given context using a digital persona of the user of the digital identity device associated with that context;
providing digital information concerning the user of the digital identity device to another party electronically;
exchanging digital information concerning the user of the digital identity device with another party electronically;
outputting a physical token containing persona information concerning the user of the digital identity device in printed form;
outputting a physical token containing human readable information concerning the user of the digital identity device; and
outputting a physical token containing machine readable information concerning the user of the digital identity device.

18. The computer program product of claim 11 further comprising:

program code for signing at least one digital persona of the user of the digital identity device;

program code for storing the at least one signed digital persona of the user of the digital identity device; and program code for only accepting context information concerning the at least one signed digital persona of the user of the digital identity device that is signed with an associated public key.

19. A computer system for dynamically discovering and utilizing current context information by a digital identity device with a user, the computer system comprising:

means for connecting to a local network;

means for requesting context information concerning a current local environment of the digital identity device;

means for receiving context information concerning the current local environment of the digital identity device, responsive to the request; and means for creating a digital persona of the user of the digital identity device based on the received context information concerning the current local environment of the digital identity device, wherein the created digital persona comprises real world information concerning the user of the digital identity device, comprising at least context specific contact information for use in a context specific transaction.

20. The computer system of claim 19 wherein the means for requesting context information concerning the current local environment of the digital identity device further comprises means for performing at least one step from a group of steps consisting of:

performing a domain name service query on a local, reserved name;

performing a domain name service query for a text record for a local, reserved name;

performing a local query via a dedicated protocol;

examining identifying information concerning at least one computing device associated with the local network; and gleaning current physical location information from a positioning system.

* * * * *